(No Model.)
G. R. WILSON.
APPARATUS FOR PREPARING INFUSIONS OF COFFEE, &c.
No. 452,405. Patented May 19, 1891.
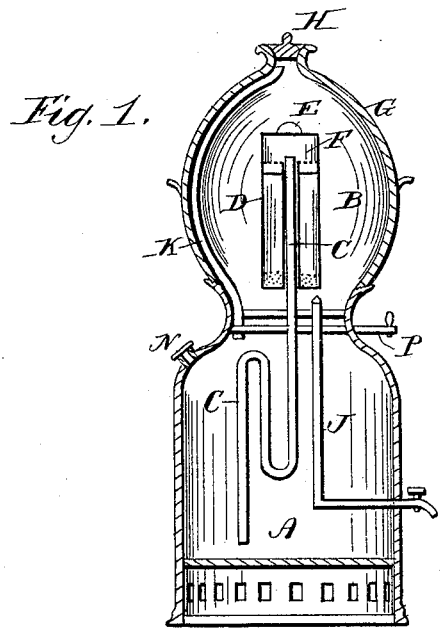
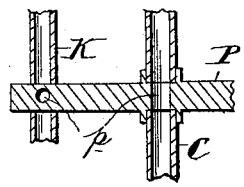
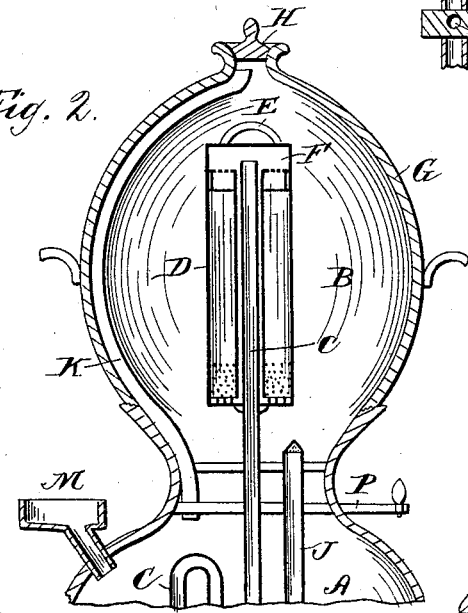
Witnesses
H. E. Walker.
Inventor
George R. Wilson,
By his Attorney
William E. Poulter.

UNITED STATES PATENT OFFICE.

GEORGE RADFORD WILSON, OF FINSBURY, ENGLAND.

APPARATUS FOR PREPARING INFUSIONS OF COFFEE, &c.

SPECIFICATION forming part of Letters Patent No. 452,405, dated May 19, 1891.

Application filed May 28, 1889. Serial No. 312,377. (No model.) Patented in England January 17, 1889, No. 905; May 10, 1888, No. 6,996, and June 12, 1888, No. 8,617.

*To all whom it may concern:*

Be it known that I, GEORGE RADFORD WILSON, a subject of the Queen of Great Britain and Ireland, residing at Finsbury, England, have invented a new and useful Apparatus for Preparing Infusions of Coffee and for Similar Purposes, (for which I have obtained patents in Great Britain, No. 905, dated January 17, 1889, No. 6,996, dated May 10, 1888, and No. 8,617, dated June 12, 1888,) of which the following is a full, clear, and exact specification.

My invention relates to improvements in apparatus for preparing infusions of coffee and tea, &c., and is illustrated in the annexed drawings, in which—

Figure 1 is a vertical section through my improved apparatus, and Fig. 2 is an elongated section showing my said improvements more clearly. Fig. 3 is an enlarged sectional detail view illustrating the construction and arrangement of tap and pipes.

I construct my apparatus or urn in two chambers, with open space under the lower chamber for gas or other means of heating.

A is the lower chamber.

B is the upper chamber.

C is a bent siphon-shaped pipe terminating at top of upper chamber B.

D is a movable perforated box having handle E to withdraw same.

F is the upper compartment of this movable box, into which the boiling water discharges.

G is the lid to upper chamber, provided with movable cap H, fitted in the aperture in the top of said lid.

J is a draw-off pipe from the upper chamber, and K is the steam-escape pipe from lower chamber A.

M shows a funnel-shaped vessel fitting into an aperture in lower chamber A, which admits water to same, and N is a screw-nut or other lock-fastening adapted to screw within the opening when the vessel M is not in use.

P is the lever of tap opening and shutting pipes C K. The pipe C is fixed to communicate between the two chambers, and this pipe is bent after the style of the letter S in the lower chamber—that is to say, first it rises straight from within about one-half an inch from floor of the lower chamber to nearly top of same, then it returns downward to nearly the bottom of this same chamber, when it again turns in an upward direction and passes right up through the top of the lower chamber and delivers at near the top of the upper chamber.

In the upper chamber and placed over and around the ascending pipe is a movable, perforated, and adjustable box D, having a central tube fitting around the pipe C. This box is divided into two compartments. The upper one is small and solid all round, except at the bottom, which is perforated. The lower compartment contains the coffee or other substance and has a perforated bottom, and the sides also are perforated for a short distance from the bottom. The boiling water from the rising pipe discharges into the top and smaller compartment of this movable box, and then descends and passes out at the bottom of the smaller compartment and the sides and bottom of the lower compartment of this movable box. The liquid from the upper chamber may be drawn off in any suitable manner.

The escape-pipe K for steam is arranged extending from the top of the lower chamber and terminating in the upper chamber in the apex and center of lid to this chamber. This lid has a hole in its center to receive the pipe, and a small movable cap is placed over said hole, which, when the steam is escaping through the pipe, is kept moving and creates a rattling noise, thus indicating that more heat is being applied underneath the urn than is needful for its duties, and which indicates that the water in the lower chamber is in a sufficiently-heated state for making a fresh infusion.

Any suitable form of tap may be used for opening and closing the pipes before referred to. I however prefer to use a double-action tap, as P', arranged to act upon the escape-steam pipe and the pipe through which the boiling water rises, and this tap I have more plainly shown in Fig. 3, in which the said tap P' is provided with ports $p$, which are so arranged that when the escape-steam pipe K is closed the ascending water-pipe C is open, as shown, and vice versa. The pipe conducting the liquid coffee for delivery has its own tap outside the apparatus, as shown.

My reason for shutting off the ascending water-pipe is so that steam may not force its way up this pipe, then through the coffee substance, and lastly through the liquid coffee, and escape through the hole in the lid, taking with it some of the strength of the coffee.

It will be readily understood that a tap in this ascending water-pipe is not strictly necessary, as a quantity of liquid will always remain in the bent siphon-shaped pipe in lower chamber, which will act as a trap.

Water may be supplied to the lower chamber in any suitable manner.

I have here, however, a further improvement. I can take off the screw-nut N or other lock-fastening opening or closing this aperture, by which water is supplied to lower chamber, and fix in its place a funnel or wide-mouthed vessel M, which vessel may be so shaped to contain any small object that requires to be kept warm, such as a milk-jug, a cup of tea or coffee, or such like. These are kept warm by means of the escape heat from hot water in lower chamber, which heat I prefer to utilize in this way to allowing it to escape over the coffee itself, when it may carry off with it some of the strength of the coffee. This vessel is so arranged that the water caused by any escape steam condensing in the vessel may run back into the lower chamber. This funnel-shaped vessel is also very useful to assist in pouring the water into the lower chamber. When it is required to put the urn into action and boil water up from the lower to the upper chamber, the screw-nut or other lock-fastening is fixed on tight to close the aperture by which water is poured into this lower chamber; also, the escape-steam pipe is shut off and the ascending water-pipe left open. The boiling water passes up this pipe and delivers into the movable box in the upper chamber, passing through the coffee and out through the said perforated box and fills the upper chamber, and is then withdrawn, as required, through a pipe traversing the lower chamber, which contains the heated water.

By the aid of my bent siphon-shaped pipe I prevent return of fluid from the upper chamber and secure the water in the lower chamber, being clear for use. A draw-off tap T is arranged from the lower chamber.

When the coffee or other substance in the movable box has been sufficiently exposed to the boiling water, I remove the lid of the upper chamber, withdraw the movable box, and then replace the lid.

The upper and lower chambers may be connected by means of a screw-joint. Glass gages may be provided to each of these upper and lower chambers, respectively, to indicate the quantity and quality of liquid contained by such chambers, respectively. Since the gages are of glass, a person can readily tell the quantity of liquid contained in the chambers, and at the same time can determine the quality or strength of the liquid in the upper chamber by noticing its color.

The upper chamber of my urn I may make in china or such like earthenware or of metal. I may enamel the interior, and may also treat the movable box containing coffee in a similar way, as it is at times objectionable for the liquid coffee to come into contact with some metals as an action is sometimes set up detrimental to the condition of the coffee or other substances.

Having fully described my invention, what I claim as new, and desire to secure by Letters Patent, is—

1. An apparatus for making coffee, comprising the lower chamber or boiler A, the upper chamber or coffee-receptacle B, a central hot-water pipe extending from the former up into the latter chamber, and the box D, closed at its top and having a central tube fitting around and inclosing said hot-water pipe to permit the delivery of the water into said box, substantially as set forth.

2. In an apparatus for making coffee, the combination, with the lower chamber or boiler A and the upper chamber B, of a water-pipe C, leading from the boiler to the upper chamber, and the escape-steam pipe K, leading from the boiler through the upper chamber and adapted to heat the contents of the latter, substantially as set forth.

3. In an apparatus for making coffee, the combination, with the casing divided into two chambers, as described, of an escape-steam pipe communicating at its lower end with the lower chamber and passing through the upper chamber, a water-pipe having an S shape, arranged within the chambers and having its lower end adjacent to the bottom of the lower chamber and its upper end adjacent to the top of the upper chamber, a receptacle for the coffee, arranged adjacent to the upper end of the water-pipe and into which receptacle said pipe discharges, for the purpose specified.

4. In an apparatus for making coffee, the combination, with the casing divided into two chambers, as described, of an escape-steam pipe communicating at its lower end with the lower chamber and passing through the upper chamber, a water-pipe having an S shape, arranged within the chambers and having its lower end adjacent to the bottom of the lower chamber and its upper end adjacent to the top of the upper chamber, means for closing the steam-pipe and simultaneously opening the water-pipe, and vice versa, a receptacle for the coffee, arranged adjacent to the upper end of the water-pipe and into which receptacle said pipe discharges, for the purpose specified.

5. In an apparatus for making coffee, the combination, with the upper and lower compartments B and A, of an escape-pipe K, a water-pipe C, taps or valves in said pipes, and an operating-handle connected with said valves and holding them in opposite positions, the one being open, while the other is shut, and extending to the exterior of the apparatus, substantially as set forth.

In witness whereof I have hereunto set my hand in presence of two witnesses.

GEORGE RADFORD WILSON.

Witnesses:
WM. S. CAPELL,
G. W. ROBBINS.